US011921215B1

(12) United States Patent
Small et al.

(10) Patent No.: US 11,921,215 B1
(45) Date of Patent: Mar. 5, 2024

(54) LIGHT DETECTING AND RANGING (LIDAR) FOR IN-SITU HELIOSTAT OPTICAL ERROR ASSESSMENT

(71) Applicant: National Technology & Engineering Solutions of Sandia, LLC, Albuquerque, NM (US)

(72) Inventors: Daniel E. Small, Albuquerque, NM (US); Charles Q. Little, Peralta, NM (US); Julius Yellowhair, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 718 days.

(21) Appl. No.: 17/065,661

(22) Filed: Oct. 8, 2020

(51) Int. Cl.
*G01S 17/894* (2020.01)
*B60R 11/00* (2006.01)
*B60R 11/04* (2006.01)
*G01S 7/48* (2006.01)
*G05D 1/00* (2006.01)

(52) U.S. Cl.
CPC ............ *G01S 17/894* (2020.01); *B60R 11/04* (2013.01); *G01S 7/4808* (2013.01); *G05D 1/0094* (2013.01); *B60R 2011/008* (2013.01)

(58) Field of Classification Search
CPC ... G01S 17/894; G01S 17/4808; B60R 11/04; B60R 2011/008; G05D 1/0094
See application file for complete search history.

(56) References Cited

U.S. PATENT DOCUMENTS

| | | | | |
|---|---|---|---|---|
| 8,582,092 B1* | 11/2013 | Yellowhair | ............. | F24S 23/74 356/138 |
| 11,476,795 B2* | 10/2022 | West | ......................... | G06N 5/01 |
| 2011/0135208 A1* | 6/2011 | Atanassov | ................ | G06T 5/50 382/218 |
| 2018/0299264 A1* | 10/2018 | Hines | ...................... | G01B 11/26 |
| 2019/0154816 A1* | 5/2019 | Hughes | ................... | G01S 7/497 |

* cited by examiner

*Primary Examiner* — Dominic J Bologna
(74) *Attorney, Agent, or Firm* — Daniel J. Jenkins

(57) ABSTRACT

A system and method for optical assessment of a heliostat includes obtaining a point cloud data representing an image of the heliostat; isolating the data; filtering and fitting the filtered heliostat data to a bounding box; translating the heliostat data to a plane to aid in segmentation; segmenting a plurality of facets of the heliostat fitting each of the segmented facets to a respective plane; generating normal vectors characterizing each of the plurality of facets; and calculating a canting angle associated with each respective facet of the plurality of facets. A heliostat with mirrored facets and a scanner are provided. The scanner captures point cloud data representing the heliostat, which is segmented for each facet. Normal vectors characterize the facets and a canting angle is calculated for the respective facet.

20 Claims, 3 Drawing Sheets

LIGHT DETECTING AND RANGING (LIDAR) FOR IN-SITU HELIOSTAT OPTICAL ERROR ASSESSMENT

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application generally relates to heliostat optical assessment. The application relates more specifically to a method and system for optical error assessment for in-situ heliostats using 2D or 3D imaging sensors. Light Detecting and Ranging (LIDAR) is an example of a 3D imaging sensor, whereas a digital camera is an example of a 2D imaging sensor.

Current methods for optical error assessment for heliostat adjustments require manual operation for identification of heliostat features. One system works using an optical method whereby the heliostat that is under assessment reflects the backing structure of a heliostat in front of it. Given a 3D model of the backing structure, and the relative angles between the camera, the heliostat under assessment and heliostat in reflection, features can be located on the backside of the heliostat in reflection. The image of the heliostat in reflection may be captured and compared to an ideal model prediction of where those features should be, based on known parameters and images of the heliostat in reflection. The difference between actual images and the ideal images indicates the relative canting errors of the heliostat under assessment.

Other methods that have been suggested involve imaging the central tower in reflection from an unmanned aerial system (UAS). The image processing may be automated.

Other methods of accessing heliostat/facet canting data are manual, slow, and crude. A method to gather accurate canting data for each facet quickly and process this data precisely, is currently lacking in the prior art. Such a system and method would provide the necessary data to access errors in the variety of optical parameters that affect the ability to optimally direct the facets.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a method for optical assessment of a heliostat includes obtaining a point cloud data representing an image of the heliostat; isolating the heliostat data; filtering the isolated heliostat data; fitting the filtered heliostat data to a bounding box; translating the heliostat data to a plane; segmenting a plurality of facets of the heliostat fitting each of the segmented facets to a respective plane; generating normal vectors characterizing each of the plurality of facets; and calculating a canting angle associated with each respective facet of the plurality of facets.

Another embodiment relates to a computer-readable storage medium. The computer-readable medium includes instructions that, when executed by a processor, cause the processor to perform acts comprising: obtaining a point cloud data representing an image of the heliostat; isolating the heliostat data; filtering the isolated heliostat data; fitting the filtered heliostat data to a bounding box; translating the heliostat data to a plane; segmenting a plurality of facets of the heliostat fitting each of the segmented facets to a respective plane; generating normal vectors characterizing each of the plurality of facets; and calculating a canting angle associated with each respective facet of the plurality of facets.

Yet another embodiment relates to a system for optical assessment of a heliostat. The system includes a heliostat with a plurality of mirrored facets and a camera. The camera captures an image of the heliostat. A computing apparatus processes the image, obtains a point cloud data representing an image of the heliostat; isolates the heliostat data, and filters the isolated heliostat data. The filtered heliostat data is fit to a bounding box. The computing apparatus translates the heliostat data to a plane and segments each of the facets of the heliostat, fits each of the segmented facets to a respective plane and generates normal vectors characterizing each of the plurality of facets. The computing apparatus then calculates a canting angle associated with each respective facet of the plurality of facets.

The disclosed method and system employing the LIDAR approach is advantageous over other optical methods. The LIDAR in-situ assessment system may be operated at night and assess a greater number of heliostats in a single mission, compared with small UAS that have limited flight times.

Another advantage is new uses for a surveying-quality 3D scanning LIDAR sensor in the automatic or autonomous assessment of the optical errors in large-scale concentrated solar power heliostat fields.

Still another advantage is demonstrated ability of a 3D-LIDAR to acquire highly accurate point cloud data across multiple heliostats.

Yet another advantage is a method to accurately determine the overall tracking angles and canting errors to 0.5 milliradians (mrad).

Another advantage is a system that improves autonomy for concentrated solar power (CSP) collector systems and addresses an autonomous assessment for the implementation of CSP collector systems.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
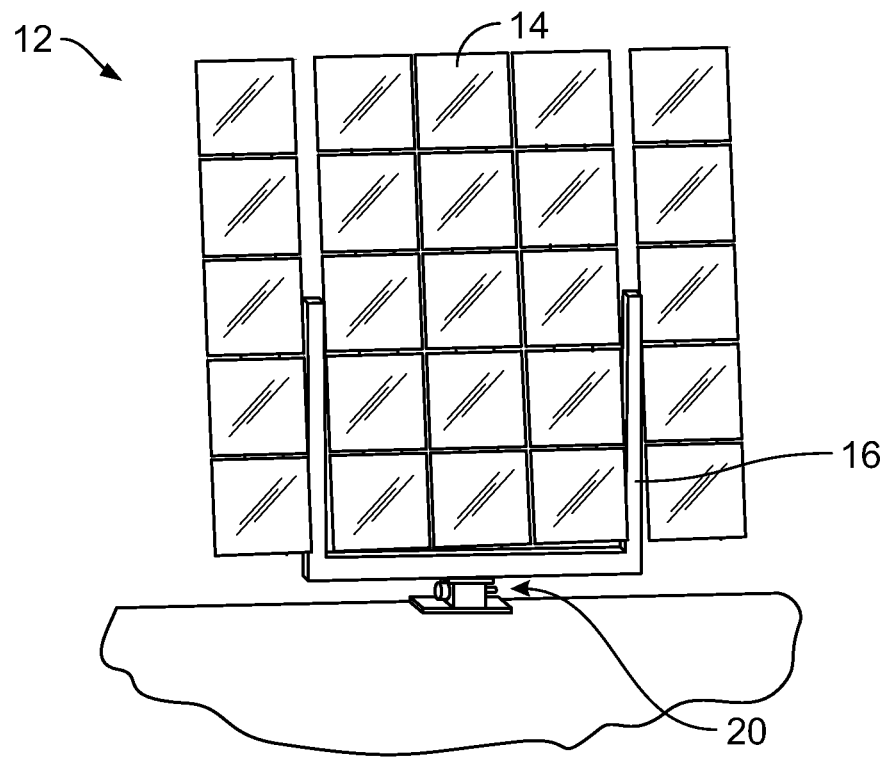
FIG. 1 shows an exemplary camera image of a heliostat of the assessment system.
Figure 3:
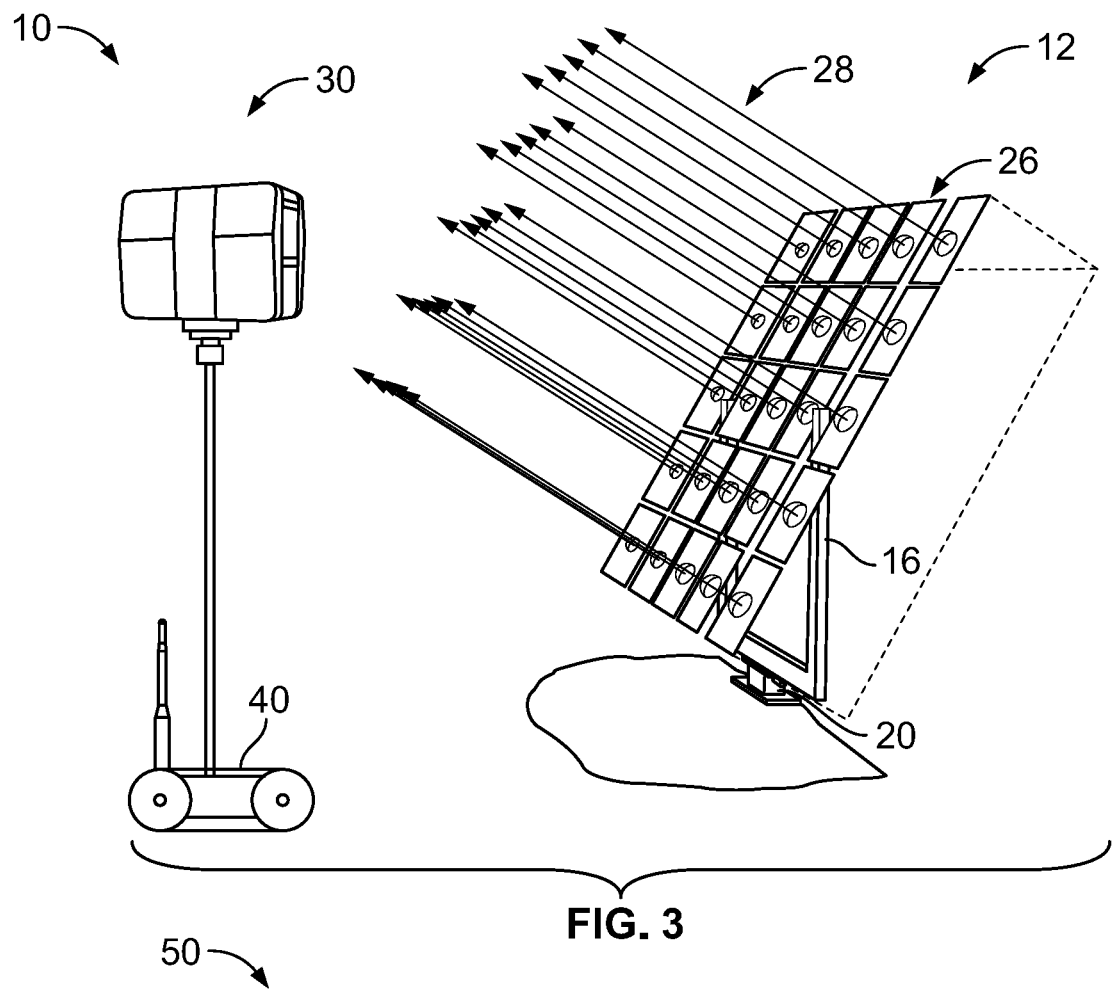
FIG. 3 shows a resultant normal vector representation and normal facet vectors for the heliostat of FIG. 1.

FIG. 1 shows an image of an exemplary heliostat 12 of the optical assessment system 10 (FIG. 3). Heliostat 12 includes a plurality of mirrored facets 14. Heliostat 12 is supported by a frame 16 that supports the plurality of mirrored facets. Frame 16 may be configured on a base 20 with two axis drives, azimuth drive integrated into base 20 and an elevation drive on the backside, not shown). Heliostat 12 can be positioned by drives 20 to receive direct solar rays as the sun moves across the sky over the course of a day. The heliostat 12 directs the reflected solar radiation received at mirrored facets 14 towards a central collector on a solar power tower. Hundreds or thousands of heliostats may be positioned proximate to a solar power tower such that a significant amount of solar radiation is concentrated at the collector on the solar power tower. The solar radiation captured by the concentrator utilizes heat energy to transform the state of a liquid into a gas to drive a turbine. Rotational energy from the turbine may then drive a generator to generate utility-grade electrical power.

Figure 2:
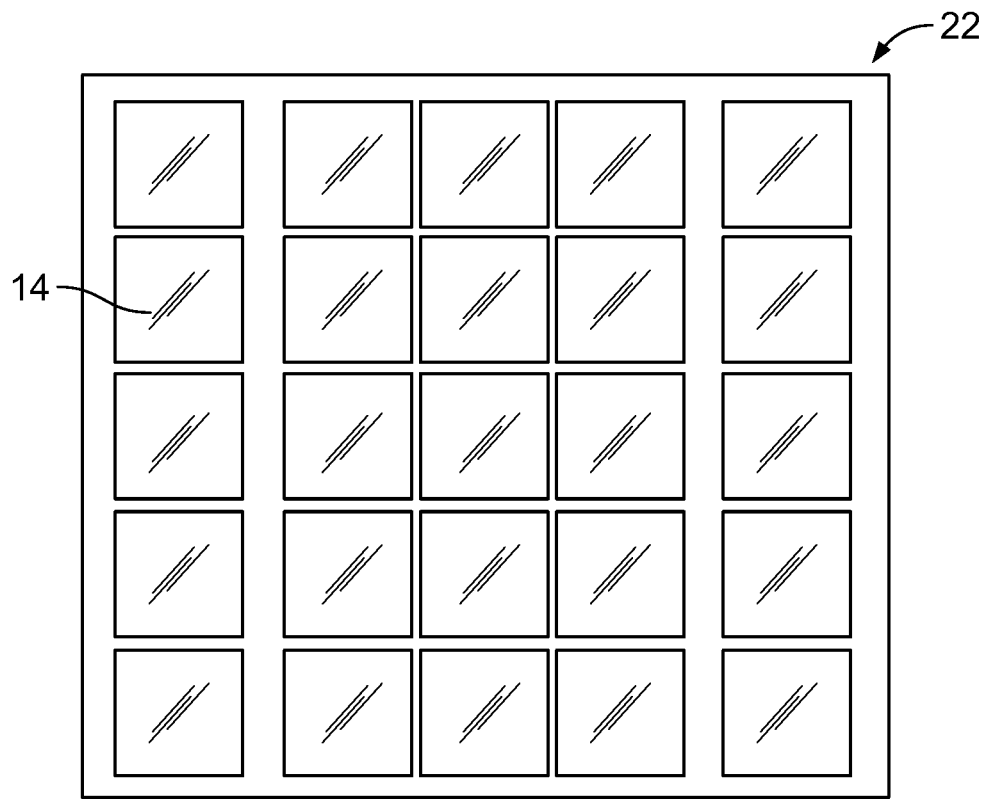
FIG. 2 shows an exemplary point cloud representation of facets generated from the camera image of FIG. 1.

FIG. 2 shows an exemplary point cloud representation 22 of facets 14 generated from the image of FIG. 1. LIDAR techniques may be used to autonomously assess optical errors in the heliostats. In an embodiment, an imaging sensor 30, e.g., a commercial scanning LIDAR sensor 30 (FIG. 3), is configured to acquire highly accurate point cloud measurements across the surface of multiple heliostat mirror arrays. For example, an imaging sensor such as a 3D laser scanner manufactured by Faro Technologies, Inc. may capture detailed imagery with a color overlay in most lighting conditions. Imaging sensor 30 may be lightweight with extended battery capacity. Thousands of 3D positioned points may be collected on each facet 14. Range accuracy may be within +/−2 millimeters (mm) out-of-plane displacement. The range accuracy allows for the determination of the relative facet canting angles for the respective facet 14. When the LIDAR sensor position is localized (GPS, landmarks, etc.), a full heliostat scan accurately determines the overall tracking angles and canting errors to within 0.5 milliradians (mrad).

The assessment system is completely automated via a software interface as described in greater detail below. In an embodiment, the system 10 may be integrated into an unmanned ground vehicle, or UGV 40 (FIG. 3). The disclosed software algorithms automate the assessment of the optical errors detected by the point cloud data.

The system 10 may be programmed to operate in varying light conditions, e.g., in full sunlight or at night. LIDAR operates better at night in low light conditions. System 10 may assess heliostat canting and tracking errors autonomously while the heliostat field is otherwise dormant. Integration into the command-and-control of a heliostat field control system allows the unmanned sensing system to place heliostat 12 under assessment in an optimal position for scanning and return the heliostat to a stowed position once completed.

Referring next to FIG. 3, a resultant normal vector representation 26 comprising normal facet vectors 28 for each facet 14 of heliostat 12 is illustrated. Normal heliostat vectors 28 are determined via the process 100 of FIG. 4, based on the point cloud representations provided by image sensor 30 mounted on UGV 40.

Figure 4:
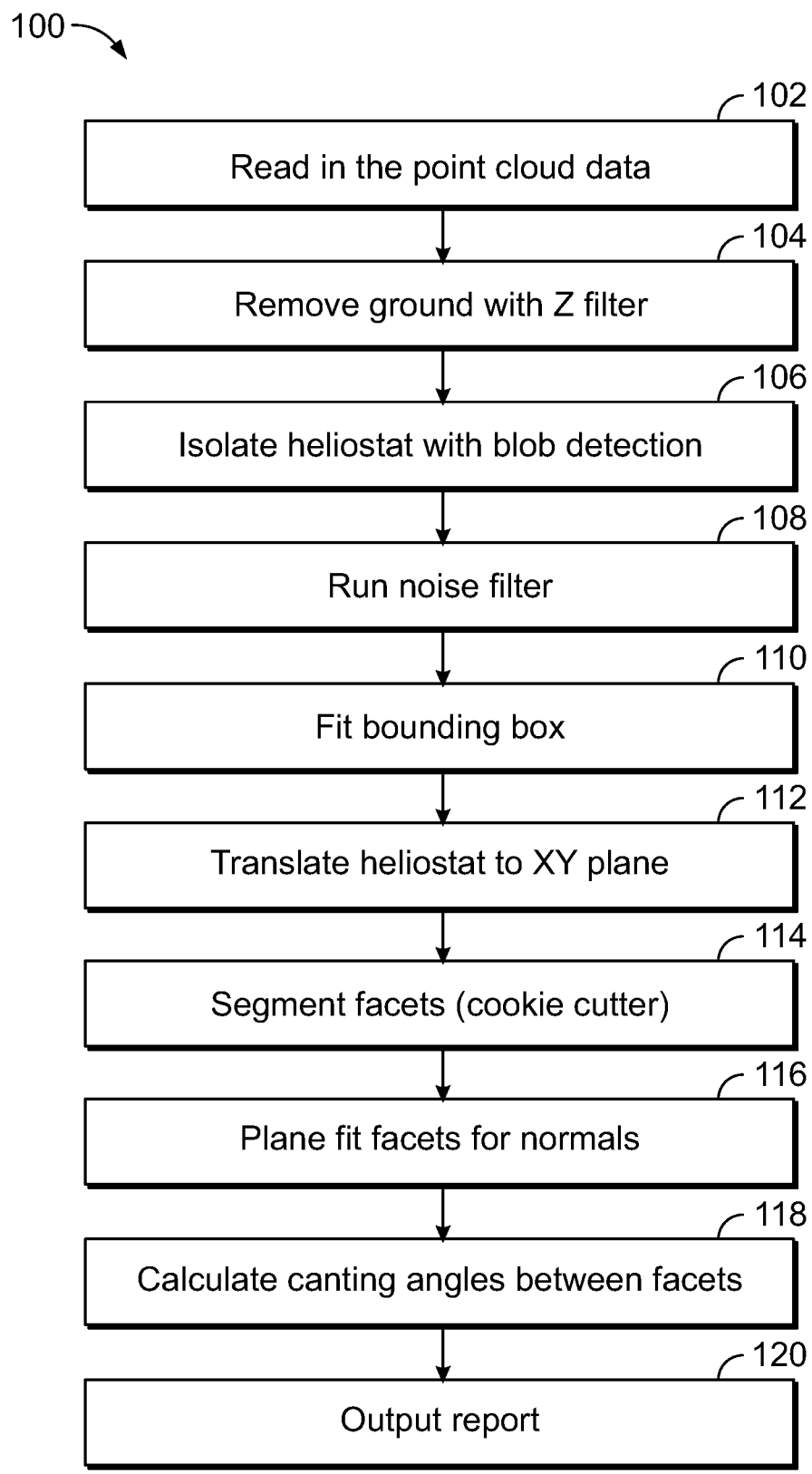
FIG. 4 is an exemplary process flow diagram of the LIDAR software algorithm for scan to facet processing.

Referring next to FIG. 4, a process flow diagram 100 shows the software algorithm for point cloud scan to facet angle processing. At step 102, the system obtains the point cloud data and proceeds to step 104 to remove ground data from the facet point cloud data using a height (Z-axis) filter. System 100 proceeds to step 106 and isolates heliostat data with a blob detection algorithm. Following step 106, at step 108 the isolated heliostat data is passed through a noise filter. Next, at step 110 the filtered heliostat data is fit to a bounding box. At step 112, the heliostat data is translated to the X-Y plane, to aid in segmentation. At step 114, facets of the heliostat are segmented. Next, at step 116 the segmented facets are fit to planes and normal vectors generated for each facet. System 100 proceeds at step 118 to calculate canting angles between each facet and at step 120 a correction report is generated.

Figure 5:
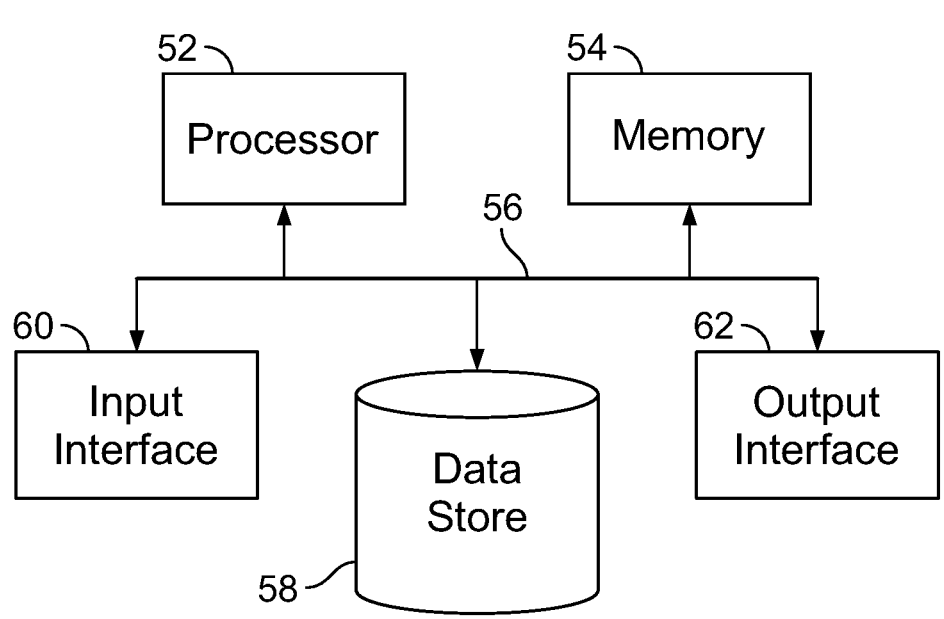
FIG. 5 is a high-level illustration of an exemplary computing device in accordance with the systems and methods of the present disclosure.

Referring next to FIG. 5, a high-level illustration of an exemplary computing device 50 that can be used in accordance with the systems and methodologies disclosed herein is illustrated. For instance, the computing device 50 may be used in a system that supports optical assessment of astigmatisms or irregularities of mirrored facets of heliostats. In another example, at least a portion of the computing device 50 may be used in a system that supports generating a point cloud representation of mirrored facets of a heliostat. The computing device 50 includes at least one processor 52 that executes instructions that are stored in a memory 54. The memory 54 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 52 may access the memory 54 by way of a system bus 56. In addition to storing executable instructions, the memory 54 may also store images, point-clouds and model-specific data. This can all be run on the computer as input to the software algorithm described in FIG. 4.

The computing device 50 additionally includes a data store 58 that is accessible by the processor 52 by way of the system bus 56. The data store 58 may be or include any suitable computer-readable storage, including a hard disk, memory, etc. The data store 58 may include executable instructions, data indicative of distances between heliostats and targets, etc. The computing device 50 also includes an input interface 60 that allows external devices to communicate with the computing device 50. For instance, the input interface 60 may be used to receive instructions from an external computer device in a wireless manner, etc. The computing device 50 also includes an output interface 62 that interfaces the computing device 50 with one or more external devices. For example, the computing device 50 may display text, images, etc., by way of the output interface 62. Additionally, the computing device 50 may transmit signals wirelessly by way of the output interface 62.

Additionally, while illustrated as a single system, it is to be understood that the computing device 50 may be a distributed system. Thus, for instance, several devices may be in communication by way of a network connection and may collectively perform tasks described as being performed by the computing device 50.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the LIDAR in-situ heliostat optical error assessment method and system, as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machine to perform a certain function or group of functions.

It should be noted that although the figures herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. A method for optical assessment of a heliostat, comprising:
    generating point cloud data representing the heliostat by measuring spatial parameters of the heliostat;
    isolating the heliostat data in the point cloud data;
    filtering the isolated heliostat data;
    fitting the filtered heliostat data to a bounding box;
    translating the heliostat data to a plane;
    segmenting a plurality of facets of the heliostat;
    fitting each of the segmented facets to a respective plane;
    generating normal vectors characterizing each of the plurality of facets; and
    calculating a canting angle associated with each respective facet of the plurality of facets; and
    correcting one or more canting angles of one or more facets of the heliostat from which the canting angle associated with each respective facet of the plurality of facets was calculated by a processor.

2. The method of claim 1, further comprising:
    generating a report including instructions for correction of optical parameters of the plurality of facets comprising the heliostat.

3. The method of claim 1, further comprising:
    removing ground data from the facet point cloud data.

4. The method of claim 3, wherein the step of removing ground data from the facet point cloud data comprises filtering the point cloud data with a Z transform digital filter.

5. The method of claim 1, wherein the step of isolating heliostat data is executed with a blob detection algorithm.

6. The method of claim 1, wherein filtering the heliostat data further comprises passing the isolated heliostat data through a noise filter.

7. A non-transitory computer-readable storage medium comprising instructions that, when executed by a processor, cause the processor to perform acts comprising:
    generating point cloud data representing the heliostat by measuring spatial parameters of the heliostat;
    isolating the heliostat data;
    filtering the isolated heliostat data;
    fitting the filtered heliostat data to a bounding box;
    translating the heliostat data to a plane;
    segmenting a plurality of facets of the heliostat;
    fitting each of the segmented facets to a respective plane;
    generating normal vectors characterizing each of the plurality of facets; and
    calculating a canting angle associated with each respective facet of the plurality of facets.

8. The method of claim 7, further comprising:
generating a report including instructions for correction of optical parameters of the plurality of facets comprising the heliostat.

9. The method of claim 8, wherein the step of removing ground data from the facet point cloud data comprises filtering the point cloud data with a Z transform digital filter.

10. The method of claim 7, further comprising:
removing ground data from the facet point cloud data.

11. The method of claim 7, wherein the step of isolating heliostat data is executed with a blob detection algorithm.

12. The method of claim 7, wherein filtering the heliostat data further comprises passing the isolated heliostat data through a noise filter.

13. A system for optical assessment of a heliostat, comprising: a heliostat comprising a plurality of mirrored facets;
an imaging sensor to capture a point cloud of the heliostat; and
a computing apparatus configured to:
process the point cloud representing an image of the heliostat;
isolate the heliostat data;
filter the isolated heliostat data;
fit the filtered heliostat data to a bounding box;
translate the heliostat data to a plane;
segment a plurality of facets of the heliostat;
fit each of the segmented facets to a respective plane;
generate normal vectors characterizing each of the plurality of facets; and
calculate a canting angle associated with each respective facet of the plurality of facets.

14. The system of claim 13, further comprising a frame supporting the heliostat; the frame comprising a base and a pair of axis drives for movably positioning the heliostat to receive direct solar rays.

15. The system of claim 13, wherein the computing apparatus is further configured to generate a point cloud representation of each facet of the plurality of facets.

16. The system of claim 13, wherein the computing apparatus is further configured to autonomously assess optical errors in the plurality of facets of the heliostat by applying a LIDAR technique.

17. The system of claim 13, wherein the camera comprises a scanning LIDAR sensor; the scanning LIDAR sensor configured to collect a plurality of 3D positioned points for each of the facets of the heliostat.

18. The system of claim 17, wherein the scanning LIDAR sensor having a range accuracy within +/−2 millimeters (mm) out-of-plane displacement for the determination of the relative facet canting angles for the respective facet.

19. The system of claim 18, wherein the scanning LIDAR sensor accurately determines the tracking angle and canting error of each facet of the plurality of facets to less than or equal to 0.5 milliradians.

20. The system of claim 13, further comprising an unmanned ground vehicle; the imaging sensor mounted on the unmanned ground vehicle and positionable through the computing apparatus to direct the imaging sensor at the heliostat to scan and return the heliostat to a stowed position.

\* \* \* \* \*